United States Patent
Yanagisawa (10) Patent No.: US 8,479,848 B2
(45) Date of Patent: Jul. 9, 2013

(54) HYBRID-TYPE CONSTRUCTION MACHINE

(75) Inventor: Makoto Yanagisawa, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 55 days.

(21) Appl. No.: 13/354,432

(22) Filed: Jan. 20, 2012

(65) Prior Publication Data

US 2012/0187756 A1    Jul. 26, 2012

(30) Foreign Application Priority Data

Jan. 25, 2011    (JP) .................. 2011-013225

(51) Int. Cl.
*B60W 10/08*    (2006.01)
*B60W 10/24*    (2006.01)

(52) U.S. Cl.
USPC ............ 180/65.265; 180/65.31; 903/930; 701/22

(58) Field of Classification Search
USPC .......... 180/65.21, 65.265, 65.285, 65.29, 180/65.31; 903/903, 930; 701/22; 320/137, 320/138, 162; 290/40 C
See application file for complete search history.

(56) References Cited

U.S. PATENT DOCUMENTS

| | | | |
|---|---|---|---|
| 6,679,346 B2 * | 1/2004 | Raftari et al. | 180/65.235 |
| 6,864,663 B2 * | 3/2005 | Komiyama et al. | 320/104 |
| 7,279,801 B2 * | 10/2007 | Kagoshima | 290/40 C |

FOREIGN PATENT DOCUMENTS

| | | |
|---|---|---|
| JP | 2000-278807 | 10/2000 |
| JP | 2006-314172 | 11/2006 |
| JP | 2009-261096 | 11/2009 |

* cited by examiner

*Primary Examiner* — John Walters
(74) *Attorney, Agent, or Firm* — IPUSA, PLLC (57) ABSTRACT

A disclosed hybrid-type construction machine includes a generator part configured to generate electric energy by the driving force of an engine; an inverter configured to control the generator part; an electric power accumulator configured to accumulate the electric energy generated by the generator part; a DC bus located between the generator part and the electric power accumulator; and a converter configured to control a voltage of the DC bus, wherein when the electric power accumulator having approximately zero electric energy is charged the inverter of the generator part is not controlled, and a reference value of a voltage command for the DC bus to charge the electric power accumulator is set to be smaller than an induced voltage of the generator part.

6 Claims, 10 Drawing Sheets

HYBRID-TYPE CONSTRUCTION MACHINE

CROSS-REFERENCE TO RELATED APPLICATIONS

This patent application is based upon and claims the benefit of priority of Japanese Patent Application No. 2011-013225 filed on Jan. 25, 2011, the entire contents of which are incorporated herein by reference.

BACKGROUND OF THE INVENTION

1. Field of the Invention

The present invention generally relates to a hybrid-type construction machine which supplies electric energy obtained by driving a motor generator which assists an engine.

2. Description of the Related Art

Patent Document 1 discloses a hybrid-type construction machine in which a motor generator (an assist motor) and an electric power accumulator for accumulating electric energy obtained by driving a motor generator or an electric power accumulating device including a battery are included. The assist motor is driven by electric energy from the electric power accumulating device to assist an engine. Alternately, the assist motor is driven by the engine to generate electricity. The generated electric energy is accumulated in an electric power accumulator of the electric power accumulator or a battery.

[Patent Document 1] Japanese Laid-open Patent Publication No. 2009-2061096

SUMMARY OF THE INVENTION

Accordingly, embodiments of the present invention may provide a novel and useful hybrid-type construction machine solving one or more of the problems discussed above.

When the electric power accumulating device is initially assembled or the electric power accumulator or the battery is replaced for maintenance, the electric power accumulator or the battery may not be charged. Especially when the electric power accumulator such as a capacitor is used, the newly assembled electric power accumulator may not be charged at all, so that the output terminal voltage of the electric power accumulator may be 0 V. Therefore, the electric power accumulator is charged when the electric power accumulating device is initially assembled or the electric power accumulator is replaced.

Further, when the electric power accumulating device has been charged and currently has a very low voltage, electricity in the electric power accumulating device may be vacant or nearly vacant, or substantially no electricity may exist in the electric power accumulating device. In this case also, the electric power accumulator is charged.

More specifically, the embodiments of the present invention may provide a hybrid-type construction machine including a generator part configured to generate electric energy by driving force of an engine; an inverter configured to control the generator part; an electric power accumulator configured to accumulate the electric energy generated by the generator part; a DC bus located between the generator part and the electric power accumulator; and a converter configured to control a voltage of the DC bus, wherein when the electric power accumulator having approximately zero electric energy is charged, the inverter of the generator part is not controlled, and a reference value of a voltage command for the DC bus to charge the electric power accumulator is set to be smaller than an induced voltage of the generator part.

Another aspect of the present invention may be to provide the hybrid-type construction machine, wherein the reference value of the voltage command for the DC bus is increased along with an increment of a voltage of the electric power accumulator.

Another aspect of the present invention may be to provide the hybrid-type construction machine, wherein when the voltage of the electric power accumulator becomes a predetermined threshold value or more, the reference value of the voltage command for the DC bus is set to be a value greater than the induced voltage.

Another aspect of the present invention may be to provide the hybrid-type construction machine, wherein when a revolution speed of the engine reaches a predetermined revolution speed the reference value of the voltage command for the DC bus is set to be a value lower than the induced voltage.

Another aspect of the present invention may be to provide the hybrid-type construction machine, wherein when a voltage of the electric power accumulator becomes a predetermined threshold value or more, the inverter of the generator part starts being controlled.

Another aspect of the present invention may be to provide the hybrid-type construction machine, wherein when an electric current flowing through the electric power accumulator has become a predetermined electric current value or more the reference value of the voltage command for the DC bus is increased.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 10 of embodiments of the present invention.

Reference symbols typically designate as follows:
1: lower-part traveling body;
1A,1B: hydraulic motor;
2: swivel mechanism;
2A: hydraulic swivel motor;
3: upper-part swivelling body;
4: boom;
5: arm;
6: bucket;
7: boom cylinder;
7A: hydraulic piping;
8: arm cylinder;
9: bucket cylinder;
10: cabin;
11: engine;
12: motor generator;
13: transmission;
14: main pump;
15: pilot pump;
16: high pressure hydraulic line;
17: control valve;
18A,18C,20: inverter;
19: capacitor;
21: swivel motor;
22: resolver;
23: mechanical brake;
24: swivel transmission;
25: pilot line;
26: operations device;
26A,26B: lever;
26C: pedal;
26D: button switch;
27: hydraulic line;
28: hydraulic line;
29: pressure sensor;
30: controller;
100: buck-boost converter;
110: DC bus;
111: DC bus voltage detecting unit;
112: capacitor voltage detecting unit;
113: capacitor current detecting unit;
120: electric power accumulation system;
300: generator part;
310: hydraulic motor; and
400: pump motor.

Figure 1:
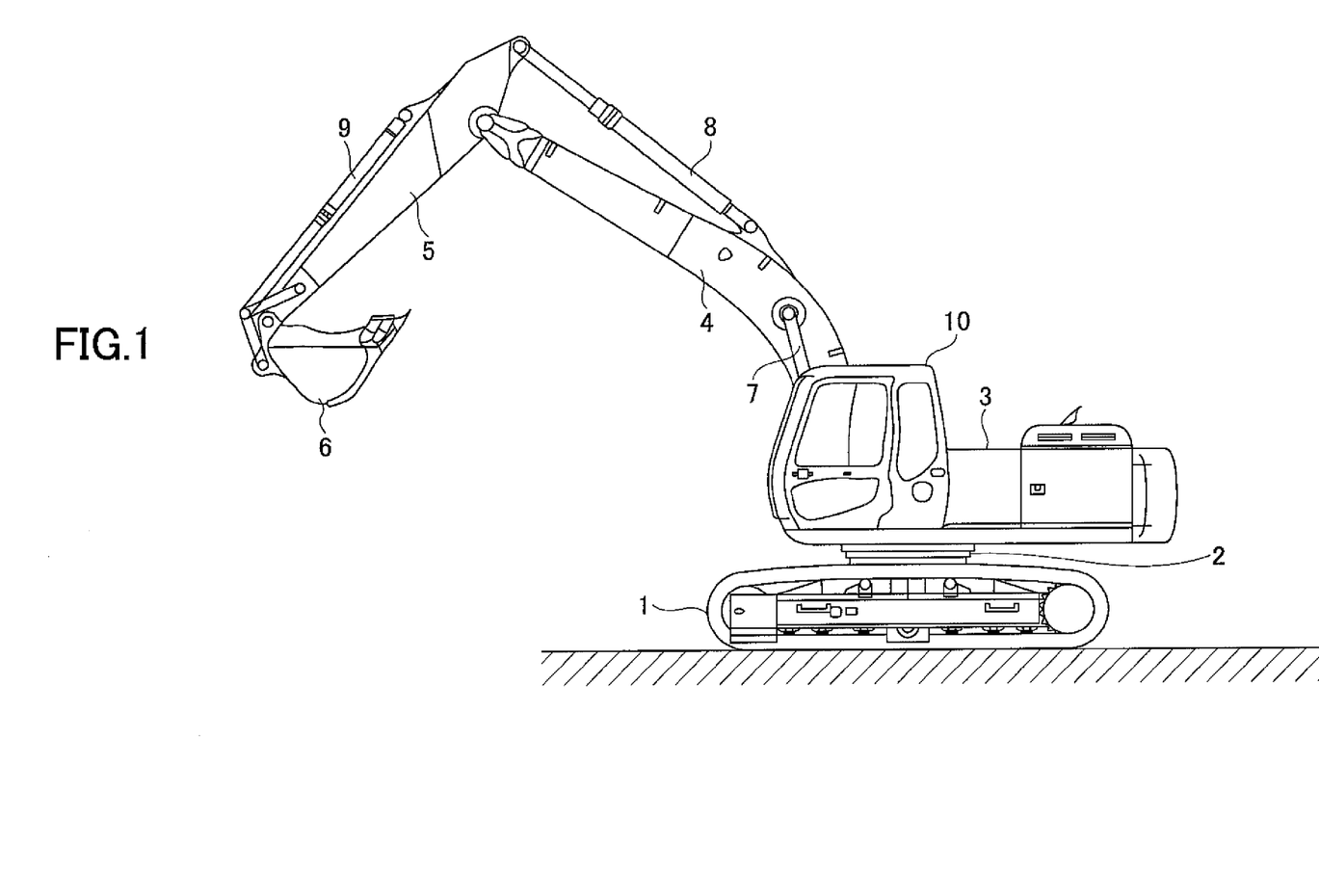
FIG. 1 is a side view of a hybrid-type hydraulic shovel as an exemplary hybrid-type working machine of an embodiment.

FIG. 1 is a side view of a hybrid-type hydraulic shovel as an exemplary hybrid-type working machine of an embodiment. The hybrid-type working machine of the embodiment is not limited to the hybrid-type hydraulic shovel. The embodiment is applicable to another hybrid-type working machine to which electric energy is supplied from an electric power accumulating device to an electric load.

An upper-part swivelling body 3 is installed on a lower-part traveling body 1 of the hybrid-type hydraulic shovel via a swivel mechanism 2. A boom 4 is attached to the upper-part swivelling body 3. An arm 5 is attached to an end of the boom 4, and a bucket 6 is attached to the end of the arm 5. The boom 4, the arm 5, and the bucket 6 are hydraulically driven by a boom cylinder 7, an arm cylinder 8, and a bucket cylinder 9, respectively. The upper-part swivelling body 3 has a cabin 10 and a power train such as an engine.

Figure 2:
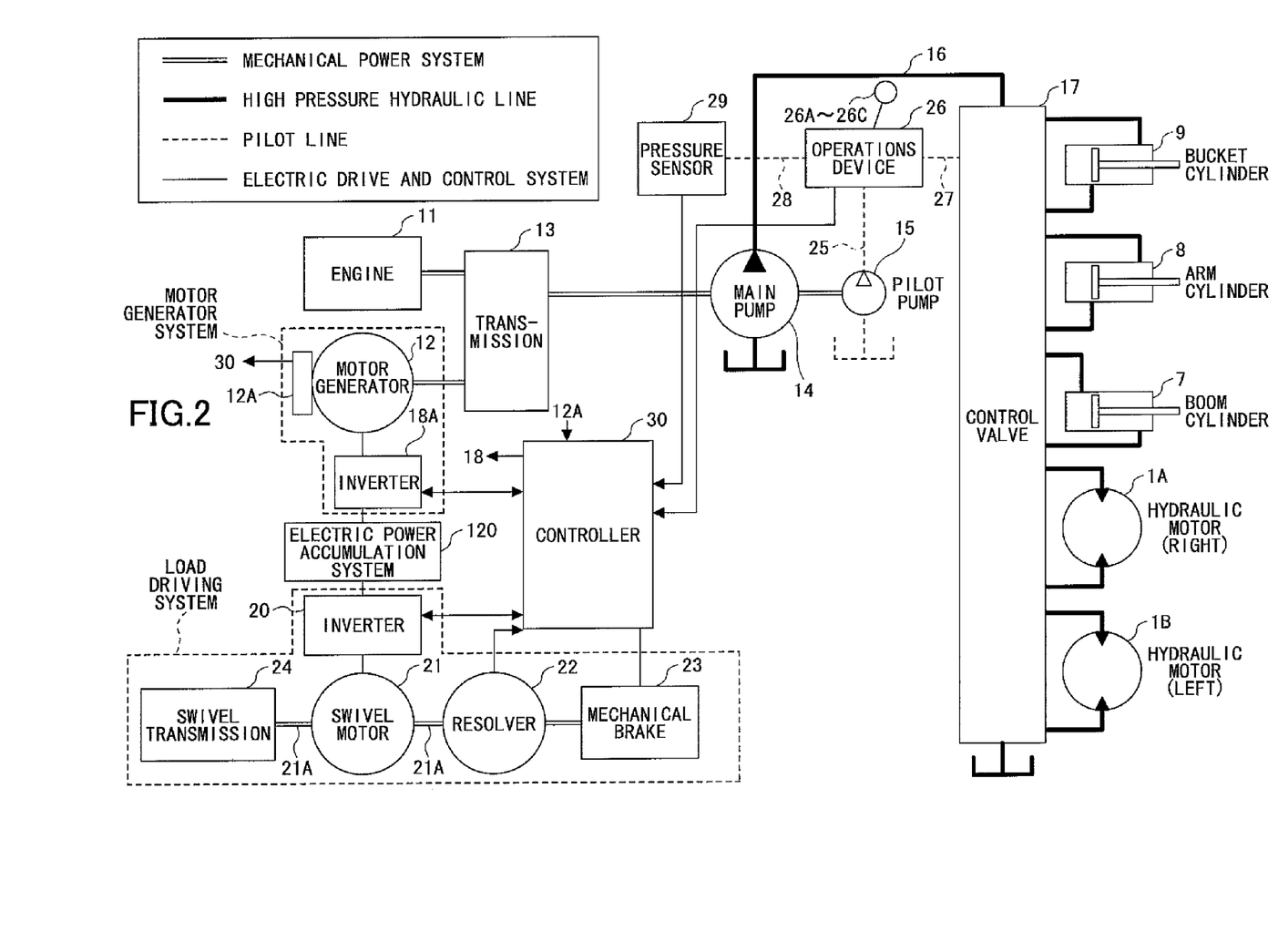
FIG. 2 is a diagram illustrating an exemplary drive system of the hybrid-type hydraulic shovel illustrated in FIG. 1.

FIG. 2 is a diagram illustrating an exemplary drive system of the hybrid-type hydraulic shovel illustrated in FIG. 1. Referring to FIG. 2, a double line, a solid line, and a broken line indicate a high pressure hydraulic pressure line, a pilot line, and an electric drive and control system, respectively.

An engine 11 as a mechanical drive part and a motor generator 12 as an assist drive part are connected to respective input shafts of a transmission 13. A main pump 14 and a pilot pump 15 are connected to an output shaft of the transmission 13. A control valve 17 is connected to the main pump 14 via a high-pressure hydraulic line 16. The main pump 14 is a variable capacity hydraulic pump in which the angle (the tilting angle) of a swash plate is controlled to adjust the stroke of a piston to thereby control the discharge flow rate. Hereinafter, the variable capacity hydraulic pump 14 may be simply referred to as a hydraulic pump 14.

The control valve 17 is a control unit that controls a hydraulic system of the hybrid-type hydraulic shovel. Hydraulic motors 1A (for the right) and 1B (for the left) for the lower-part traveling body 1, the boom cylinder 7, the arm cylinder 8, and the bucket cylinder 9 are connected to the control valve 17 via the high-pressure hydraulic line 16. A swivel hydraulic motor 2A for driving the swivel mechanism 2 is connected to the control valve 17 (see FIG. 9).

An electric power accumulation system 120 (an electric power accumulating device) including an electric power accumulator 19 (see FIG. 3) is connected to the motor generator 12 via an inverter 18A. An operations device 26 is connected to a pilot pump 15 via the pilot line 25. The operations device 26 includes a lever 26A, a lever 26B and a pedal 26C. The lever 26A, the lever 26B and the pedal 26C are connected to the control valve 17 and a pressure sensor 29 via hydraulic lines 27 and 28. The pressure sensor 29 is connected to a controller 30 which controls driving of the electric system.

The controller 30 switches over drive control of the motor generator 12 between a motor (assisting) and a generator, and simultaneously controls to charge or discharge the electric power accumulator (a capacitor) 19 by driving a buck-boost converter 100 (see FIG. 3) as a buck-boost converting unit. The controller 30 switches over between a boosting operation and a bucking operation of the buck-boost converter 100 based on a charged state of the electric power accumulator (the capacitor) and operating condition of the motor generator 12 as the motor or the generator thereby controlling charging and discharging of the electric power accumulator (the capacitor) 19.

Figure 3:
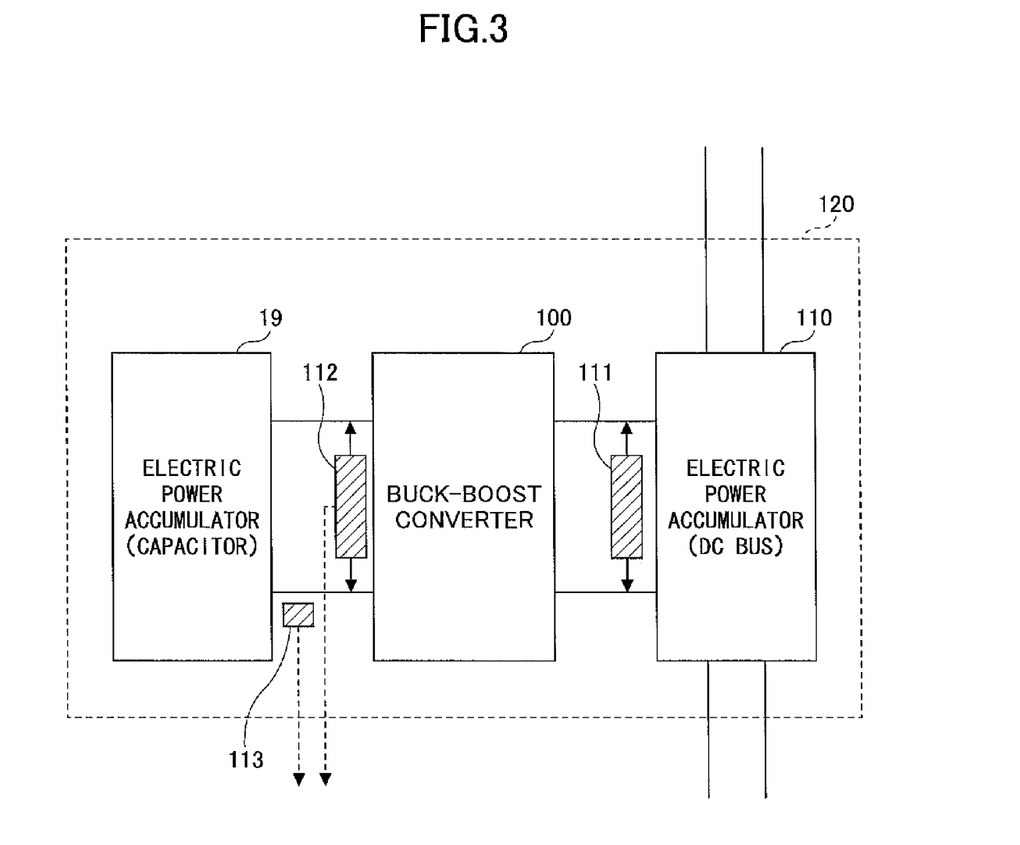
FIG. 3 is a block chart illustrating an exemplary structure of an electric power accumulation system.

The boosting operation and the bucking operation of the buck-boost converter are switched over based on a DC bus voltage value detected by a DC bus voltage detecting unit 111 provided in a DC bus 110, an electric power accumulator voltage value detected by a voltage detecting unit 111 for electric power accumulator, and an electric power accumulator current value detected by a current detecting unit for electric power accumulator 19.

Further, the charging rate SOC of the electric power accumulator (a capacitor) 19 is calculated based on the electric power accumulator voltage value detected by a voltage detecting unit 112 for electric power accumulator 19.

In the hybrid-type hydraulic shovel illustrated in FIG. 2, the swivel mechanism 2 is electromotive. A swivel motor 21 is provided to drive the swivel mechanism 2. The swivel motor 21 for the electromotive operation is connected to the electric power accumulation system 120 via an inverter 20. A resolver 22, a mechanical brake 23, and a swivel transmission 24 are connected to a rotational shaft 21A of the swivel motor 21. A load driving system is formed by the swivel motor 21, the inverter 20, the resolver 22, the mechanical brake 23 and the swivel transmission 24.

FIG. 3 is a block chart illustrating an exemplary structure of the electric power accumulation system 120. The electric power accumulation system 120 includes the capacitor 19 as an electric power accumulator, the buck-boost converter 100 and the DC bus 110. The DC bus 110 controls exchange of electric power among the capacitor 19, the motor generator 12 and the swivel motor 21. The capacitor 19 includes the capacitor voltage detecting unit 112 for detecting a capacitor voltage value and a capacitor current detecting unit 113 for detecting a capacitor current value. The capacitor voltage value and the capacitor current value detected by the capacitor voltage detecting unit 112 and the capacitor current detecting unit 113 are supplied to the controller 30.

The buck-boost converter 100 switches over between the boosting operation and the bucking operation so as to bring the DC bus voltage within a predetermined range depending on running states of the motor generator 12 and the swivel motor 21. The DC bus 110 is connected to the inverter 18A, the inverter 20 and the buck-boost converter 100 to exchange electric energy among the capacitor 19, the motor generator 12 and the swivel motor 21.

Referring back to FIG. 2, the controller 30 is a main controller for controlling driving of the hybrid-type hydraulic shovel. The controller 30 includes an arithmetic processing unit including a Central Processing Unit (CPU) and an internal memory. When the CPU executes a program for drive control stored in an internal memory, the controller function is realized.

The controller 30 converts a signal supplied from the pressure sensor 29 to a speed command to thereby control driving of the swivel motor 21. The signal supplied from the pressure sensor 29 corresponds to a signal indicative of an operation amount for operating the operations device 26 for swiveling the swivel mechanism 2.

The controller 30 switches over drive control of the motor generator 12 between the motor (assisting) and the generator, and simultaneously controls to charge or discharge the capacitor 19 by driving the buck-boost converter 100 as the buck-boost converting unit. The controller 30 switches over between the boosting operation and the bucking operation of the buck-boost converter 100 based on the charge state of the capacitor 19, an operational state of the motor generator 12 (a motor operation (an assisting operation) or a generation operation) and an operational state of the swivel motor 21 (a power running operation or a regenerative operation) to thereby charge or discharge the capacitor 19.

The switch-over between the boosting operation and the bucking operation of the buck-boost converter 100 is controlled based on the DC bus voltage detected by the DC bus voltage detecting unit 111, the capacitor voltage value detected by the capacitor voltage detecting unit 112 and the capacitor current value detected by the capacitor current detecting unit 113.

In the above described structure, the electric power generated by the motor generator 12 as the assist motor is supplied to the DC bus 110 of the power accumulation system 120 via the inverter 18A and supplied to the capacitor 19 via the buck-boost converter 100. In the above described structure, the electric power generated by the swivel motor 21 is supplied to the DC bus 110 of the power accumulation system 120 via the inverter 18A and supplied to the capacitor 19 via the buck-boost converter 100.

Figure 4:
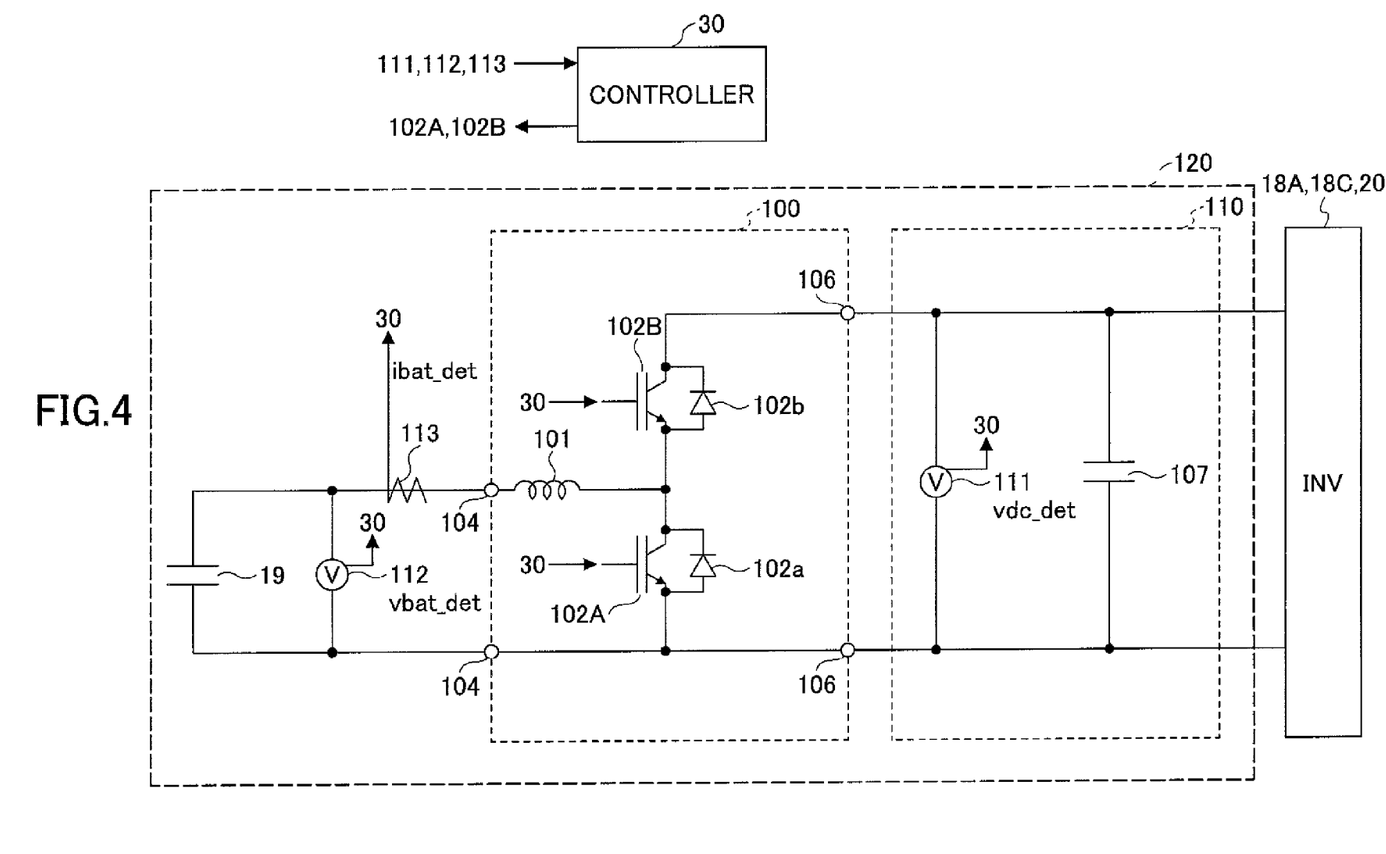
FIG. 4 is an exemplary circuit diagram of the electric power accumulation system.

FIG. 4 is an exemplary circuit diagram of the electric power accumulation system. The buck-boost converter 100 includes a reactor (inductor) 101, an insulated gate bipolar transistor (IGBT) for a boosting operation 102A, an insulated gate bipolar transistor (IGBT) for a bucking operation 102B, electric power connection terminals 104 for connecting the capacitor 19, and output terminals 106 for connecting an inverter 18A, 18C, or 20. The DC bus 110 connects the output terminals 106 of the buck-boost converter 100 to the inverter 18A, 18C or 20.

An end of the reactor 101 is connected to an intermediate point between the IGBT for the boosting operation 102A and the IGBT for the bucking operation 102B, and the other end of the reactor 101 is connected to the electric power connection terminal 104. The reactor 101 is provided to supply induced electromotive force caused when the IGBT for the boosting operation 102A is turned on and off.

Each of the IGBT for the boosting operation 102A and the IGBT for the bucking operation 102B includes a bipolar transistor having a gate in which a metal oxide semiconductor field effect transistor is integrated. The IGBT for the boosting operation 102A and the IGBT for the bucking operation 102B are semiconductor elements (switching elements) which can perform high-power and high-speed switching. The IGBT for the boasting operation 102A and the IGBT for the bucking operation 102B are driven by the controller 30 when a PWM voltage is applied to the respective gate terminals. Diodes 102a and 102b being rectifying elements are connected parallel to the IGBT for the boosting operation 102A and the IGBT for the bucking operation 1023, respectively.

The capacitor 19 may be an electric power accumulator which can be charged and discharged so that electric power is exchanged between the capacitor 19 and the DC bus 110 via the buck-boost converter 100. FIG. 4 illustrates the capacitor 19 as an electric power accumulator. However, a chargeable and dischargeable secondary battery such as a lithium ion battery, a lithium ion capacitor, or another mode of a power source capable of exchanging electric power may be used instead of the capacitor 19.

The electric power connection terminals 104 and the output terminals 106 may be any type as long as the capacitor 1a and the inverter 18A, 18C, or 20 are connectable, respectively. The capacitor voltage detecting unit 112 for detecting the capacitor voltage is connected between the electric power connection terminals 104. The DC bus voltage detecting unit 111 for detecting the DC bus voltage is connected between the output terminals 106.

The capacitor voltage detecting unit 112 detects a voltage value Vcap of the capacitor 19. The DC bus voltage detecting unit 111 detects a voltage value Vdc of the DC bus 110. A smoothing capacitor 107 is inserted into a positive electrode and a negative electrode of the output terminals 106 and smoothes the DC bus voltage.

The capacitor current detecting unit 113 detects a value of a current flowing into the capacitor 19 on a side of the positive electrode (a P terminal) of the capacitor 19 and includes a resistor for detecting the current. The capacitor current detecting unit 113 detects a current value I1 flowing through the positive electrode of the capacitor 19. The capacitor current detecting unit 113 detects the value of the current flowing into the capacitor 19 on a side of the negative electrode (an N terminal) of the capacitor 19 and includes a resistor for detecting the current. The capacitor current detecting unit 113 detects a current value I2 flowing through the negative electrode of the capacitor 19.

When a boosting operation is performed in the buck-boost converter 100, a PWM voltage is applied to the gate electrode of the IGBT for the boosting operation 102A. Therefore, induced electromotive force which is generated in the reactor 101 while turning on and off the IGBT for the boosting operation 102A via a diode 102b connected parallel to the IGBT for the bucking operation 102B is supplied to the DC bus 110. With this, the DC bus 110 undergoes the boosting operation.

When the DC bus 110 is bucked, the PWM voltage is applied to the gate terminal of the IGBT for the bucking operation 102B, regenerative electric power supplied from the inverter 18A, 18C or 20 via the IGBT for the bucking operation 102B is supplied to the capacitor 19 via the DC bus 110. Then, the electric energy stored in the DC bus charges the capacitor 19 and the DC bus 110 is bucked.

A driving unit for generating the PWM signal for driving the IGBT for the boosting operation 102A and the IGBT for the bucking operation 102B exists in the controller 30 as indicated by the reference symbols 30,30. The driving unit (not illustrated) may exist between the controller 30 and the IGBT for the boosting operation 102A and the IGBT for the bucking operation 102B. The driving unit may be realized by an electronic circuit or an arithmetic processing unit.

The electric power accumulator 19 is initially charged by supplying the electric power which is obtained by a generating operation of the assist motor 12 (the motor generator) to the electric power accumulating device 120. In the electric power accumulating device 120, the electric power accumulator 19 is connected to the DC bus 110 via the converter 100. By increasing the DC bus voltage by supplying the electric power from the assist motor 12 (the motor generator) to the DC bus 110, the electric power is supplied from the DC bus to the electric power accumulator 19 via the converter 100.

As described, when the electric power accumulator 19 is not charged (the voltage between the output terminals is 0 V), an internal resistance of the electric power accumulator 19 is very small. (approximately 0Ω). Therefore, even if the electric power supplied to the DC bus 110 is small (the DC bus voltage is small), a great charging current flows into the electric power accumulator 19.

Ordinarily, the electric power accumulator 19 is initially charged by supplying the electric power obtained by the generating operation of the assist motor 12 to the DC bus 110. Said differently, by sending a command for generating predetermined electric power to the assist motor 12 to increase the electric power generated by the assist motor 12 to the DC bus 110, the charging current flows from the DC bus 110 to the electric power accumulator 19. The command for the electric power generation sent to the assist motor 12 is controlled under the ordinary electric power accumulating device 120. The DC bus voltage is controlled to be a target voltage under ordinary control of the electric power accumulating device 120.

The electric power generated by the assist motor 12 may greatly vary due to variation of the revolution speed of the engine, and also to error of a reference value of the command of the electric power generation. When the electric power generated by the assist motor 12 becomes greater than the reference value of the command of the electric power generation, the electric power supplied to the DC bus 110 becomes great. Therefore, the charging current becomes great in proportion to the electric power. When the electric power accumulator is charged to a certain extent and the internal resistance is increased, the charging current does not greatly increase even if the electric power supplied to the DC bus becomes great. Thus, the charging current is suppressed to be a permissible value or less. However, if the internal resistance of the electric power accumulator is extremely small and the power supplied to the DC bus 110 increases, the charging current may greatly increase so as to exceed the permissible value.

Specifically, if the electric power accumulator is charged to a certain extent and the terminal voltage of the electric power accumulator is, for example, 10 V, a charging current of 10 A (100 [W]/10[V]=10 [A]) flows into the electric power accumulator after supplying electric power of 100 W. If the electric power supplied to the DC bus increases to be 200 W, a charging current of 20 A (200 [W]/10[V]=10 [A]) flows into the electric power accumulator. In this case, the increment of the charging current is 10 A, which is in a permissible range of the charging current of, for example, 150 A. On the other hand, if the terminal voltage of the electric power accumulator is, for example, 1 V when the electric power accumulator is initially charged, a charging current of 100 A (100 [W]/10 [V]=100 [A]) flows into the electric power accumulator. If the electric power supplied to the DC bus increases to be 200 W, a charging current of 200 A (200 [W]/1[V]=200 [A]) flows into the electric power accumulator. The increment of the charging current is 100 A, with which the permissible value of 150 A is exceeded.

If the charging current for the electric power accumulator 19 exceeds the permissible value, a protection function may be performed to stop the operation of the electric power accumulating device 120 as the electric power accumulator 19 and the electric power accumulating device 120 may be damaged by the excessive electric current.

Therefore, it is preferable to appropriately control the charging of the electric power accumulating device 120.

In the above hybrid-type hydraulic shovel of the embodiment, by starting to charge with the DC bus voltage smaller than the ordinary DC bus voltage instead of the ordinary DC bus voltage in initially charging the capacitor 19, it is possible to prevent excessive current from flowing through the capacitor 19. Hereinafter, the charging method is described.

In initially charging the capacitor 19, the motor generator 12 is not controlled for generating electricity (the command of the electric power generation is not issued). Instead, the induced voltage obtained by idling the motor generator 12 is introduced into the DC bus 110, the charging current flows through the capacitor 19 to thereby charge the capacitor 19. If a reference value of the voltage command for the DC bus 110 is not an ordinary reference value of the voltage command for the DC bus 110 and is set to be a value smaller than the induced voltage, power corresponding to a difference between the induced voltage supplied to the DC bus 110 and the reference value of the voltage command for the DC bus 110 is supplied to the capacitor 19 to thereby charge the capacitor 19. Initially charging the capacitor 19 is not only charging the capacitor 19 for the first time but also charging the capacitor 19 which has been charged and currently has a very low voltage (electricity in the capacitor 19 is vacant or nearly vacant, or approximately zero electric charge exists in the capacitor 19).

Figure 5:
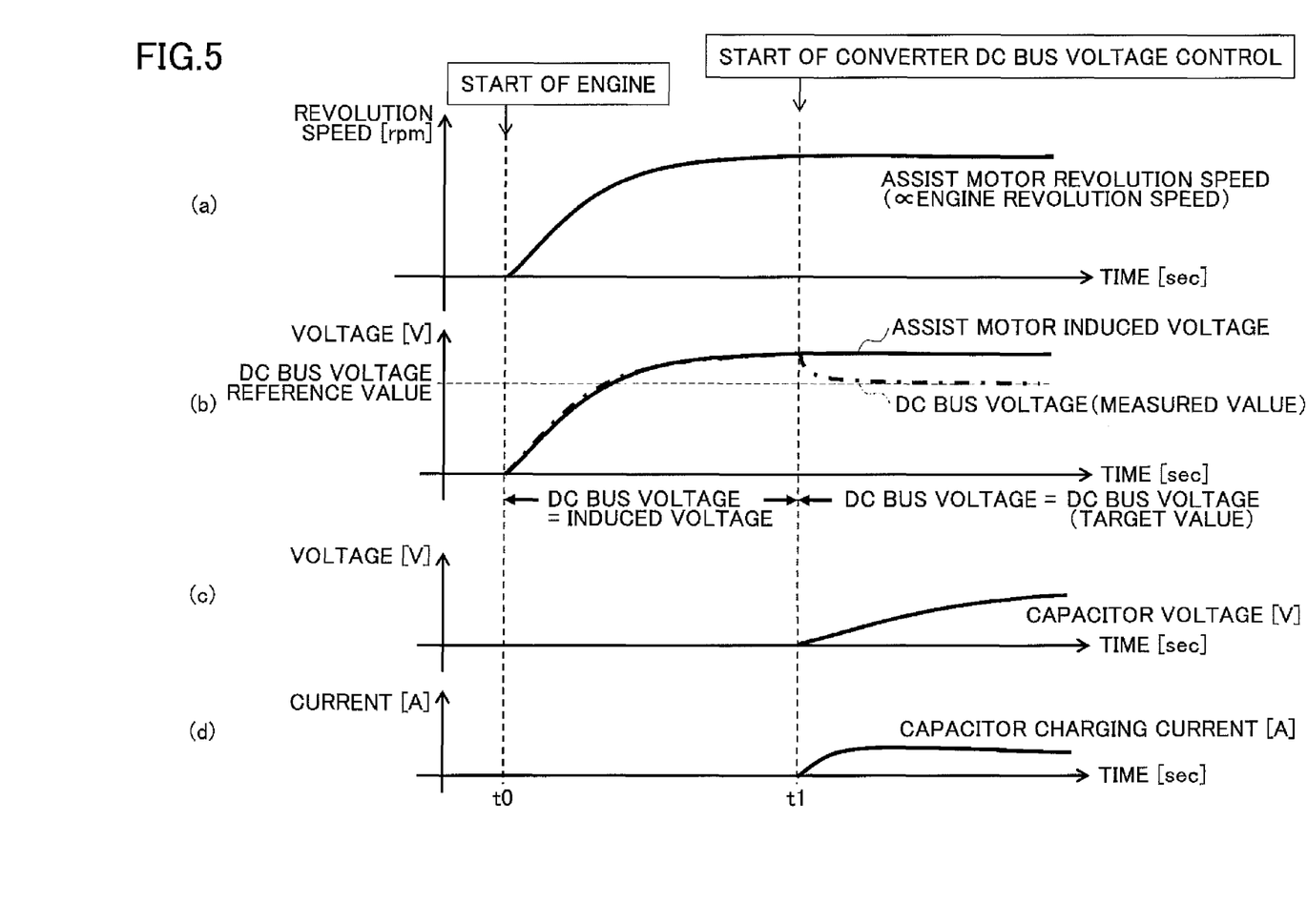
FIG. 5 is a graph illustrating temporal changes of an engine revolution speed, a DC bus voltage, a capacitor voltage and a charging current at a time of initially charging the capacitor.

FIG. 5 illustrates temporal changes of the engine revolution speed, the voltage of the DC bus 110, the voltage of the capacitor 19, and the charging current flowing through the capacitor 19 in initially charging the capacitor 19 of the embodiment.

When the capacitor 19 is initially charged, the control of the inverter 18A for the motor generator 12 is stopped. While stopping the voltage control of the DC bus 110, the engine 11 is driven at a predetermined revolution speed. Referring to (a) of FIG. 5, when the engine 11 is started, the revolution speed of the engine 11 increases and becomes constant at the predetermined revolution speed. Along with the rotation of the engine 11, the motor generator 12 mechanically connected to the engine 11 rotates and the motor generator 12 generates the induced voltage corresponding to the revolution speed. Because the induced voltage generated by the motor generator 12 is supplied to the DC bus 110, the voltage of the DC bus 110 (hereinafter, referred to as a DC bus voltage) increases with the revolution speed of the engine 11 indicated by the solid line in (b) of FIG. 5. After the revolution speed of the engine 11 becomes constant, the DC bus voltage has a constant induced voltage corresponding to the revolution speed.

When the capacitor 19 is initially charged, the reference value of the voltage command for the DC bus 110 is not set as the reference value in the ordinary control and is set as a value lower than the induced voltage generated when the motor generator 12 has a constant revolution speed. Therefore, as illustrated by one-dot chain line of (b) of FIG. 5, the DC bus voltage becomes higher than the reference value of the voltage command for the DC bus 110 (a DC bus voltage reference value) and subsequently becomes constant as the engine revolution speed increases after the engine 11 starts. Referring to (b) of FIG. 5, the induced voltage of the motor generator 12 is indicated by the solid line and the DC bus voltage is indicated by the one dot chain line. Before starting the voltage control (the converter voltage control) of the buck-boost converter 100, the DC bus voltage is equal to the induced voltage, and the solid line and the one dot chain, line overlap. However, for convenience, the width of the one dot chain line of the DC bus voltage is increased so as to be observed under the solid line of the induced voltage.

When the DC bus voltage becomes higher than the DC bus voltage reference value and further becomes constant, the voltage control of the buck-boost converter 100 is started. Then, in order for the DC bus voltage to be made equal to the DC bus voltage reference value, the converter 100 sends an electric current to the capacitor 19 via the DC bus 110. Referring to (d) of FIG. 5, the electric current sent from the converter 100 is the charging current to charge the capacitor 19. By the flow of the charging current into the capacitor 19, the capacitor voltage increases as illustrated in (c) of FIG. 5.

As described, the charging current of the capacitor 19 corresponds to a voltage difference between the induced voltage of the motor generator 12 and the DC bus voltage reference value. Therefore, by setting the DC bus voltage reference value so that the voltage difference between the induced voltage of the motor generator 12 and the DC bus voltage reference value does not become too great, the charging current of the capacitor 19 can be prevented from increasing. For example, the voltage difference between the induced voltage of the motor generator 12 and the DC bus voltage reference value is as small as 10 V. Therefore, by setting the DC bus voltage reference value to be an appropriate value smaller than the induced voltage of the motor generator 12, it is possible to prevent the charging current to the capacitor 19 from being the excessive electric current. The induced voltage of the motor generator 12 is proportional to the revolution speed of the motor generator 12. Therefore, the DC bus voltage reference value may be previously set as table information as a value proportional to the revolution speed of the motor generator 12. By referring to the table information, the DC bus voltage reference value to be set in association with the present revolution speed of the motor generator 12 is obtainable.

In the above capacitor charging method, the charging current is set low and a time for charging the capacitor 19 so as to be a usable charging rate SOC becomes necessary. Therefore, if the capacitor voltage becomes great after charging the capacitor 19 to a certain extent, the ordinary control of the DC bus voltage is performed to generate the motor generator 12 to quickly charge the capacitor 19.

Figure 6:
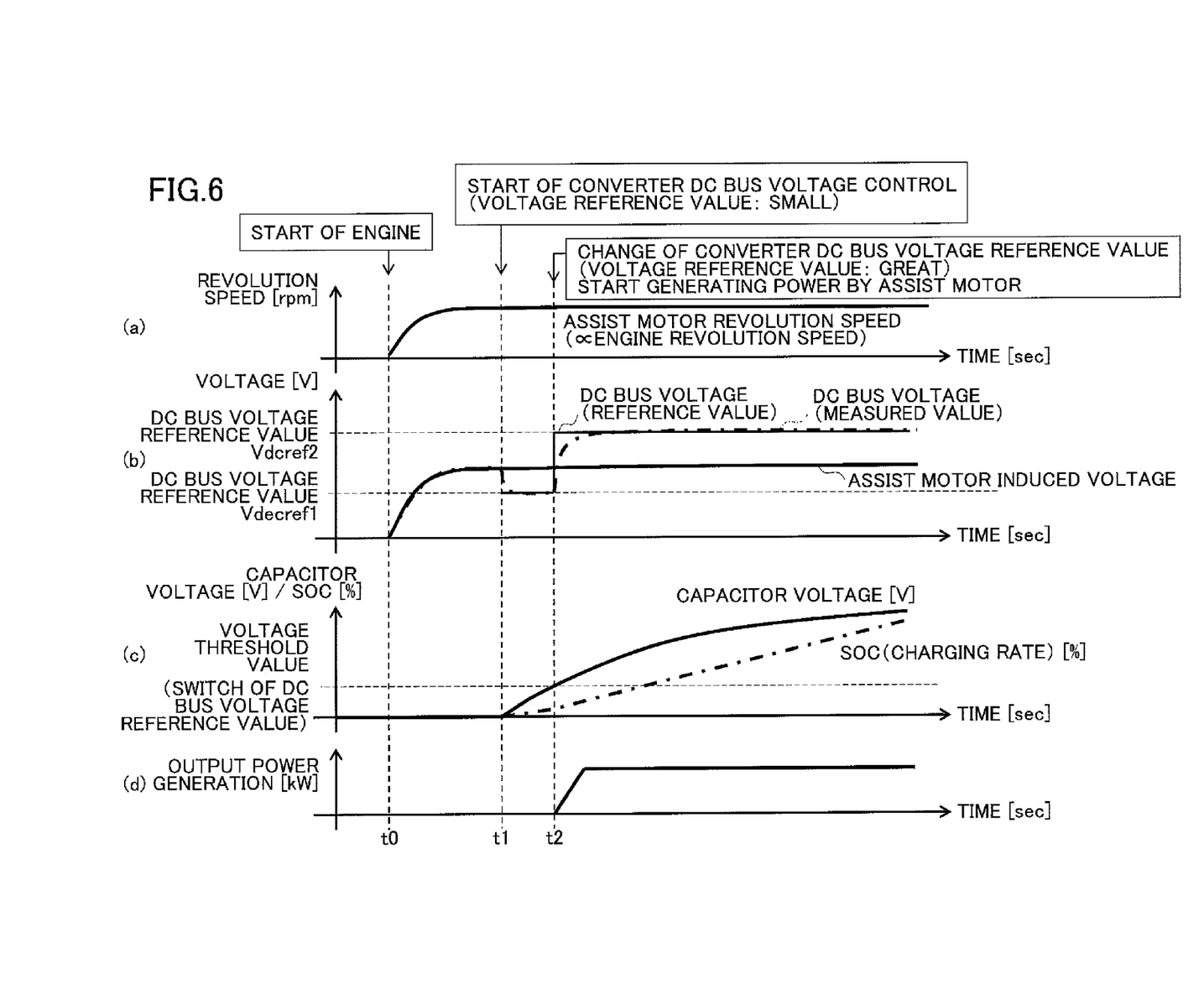
FIG. 6 is a graph illustrating temporal changes of the engine revolution speed, the DC bus voltage, the capacitor voltage and generated power from a motor generator at a time of rapidly charging the capacitor when the capacitor voltage exceeds a threshold value.

FIG. 6 illustrates temporal changes of the engine revolution speed, the DC bus voltage, the capacitor 19 voltage and the generated power of the motor generator 12 in a case where the capacitor 19 is quickly charged by generating electricity by the motor generator when the capacitor voltage exceeds the threshold value. The processes between starting the engine 11 and charging the capacitor 19 with the charging current corresponding to the difference between the induced voltage and the DC bus voltage reference value are the same as those in the above charging method. In the charging method, the capacitor voltage is monitored after starting charging the capacitor 19 and when the capacitor voltage exceeds the threshold value charging is performed by the ordinary control. The charging performed by the ordinary control means that the capacitor 19 is charged by changing the DC bus voltage reference value from a small reference value of the voltage command (Vdcref1) to a great DC bus voltage reference value (Vdcref2) used in the ordinary operation and supplying electric power to the DC bus 110 using electric power generation operation by the motor generator 12.

Specifically, when the capacitor voltage exceeds the threshold value as illustrated by the solid line of (c) of FIG. 6, the DC bus voltage reference value is switched from a small reference value (Vdcref1) to a great reference value (Vdcref2) which is ordinarily used. Simultaneously, the stopped control of the inverter 18A of the motor generator 12 is restarted. With this, as illustrated in (d) of FIG. 6, the motor generator 12 supplies great electric power to the DC bus 110 by performing the generation operation so that the actual DC bus voltage becomes closer to the great reference value (Vdcref2) of the voltage command under the ordinary operation. Thus, the charging current to the capacitor 19 becomes great to thereby quickly increase the charging rate SOC of the capacitor 19 as indicated by the dot-chain line of (c) of FIG. 6.

Figure 7:
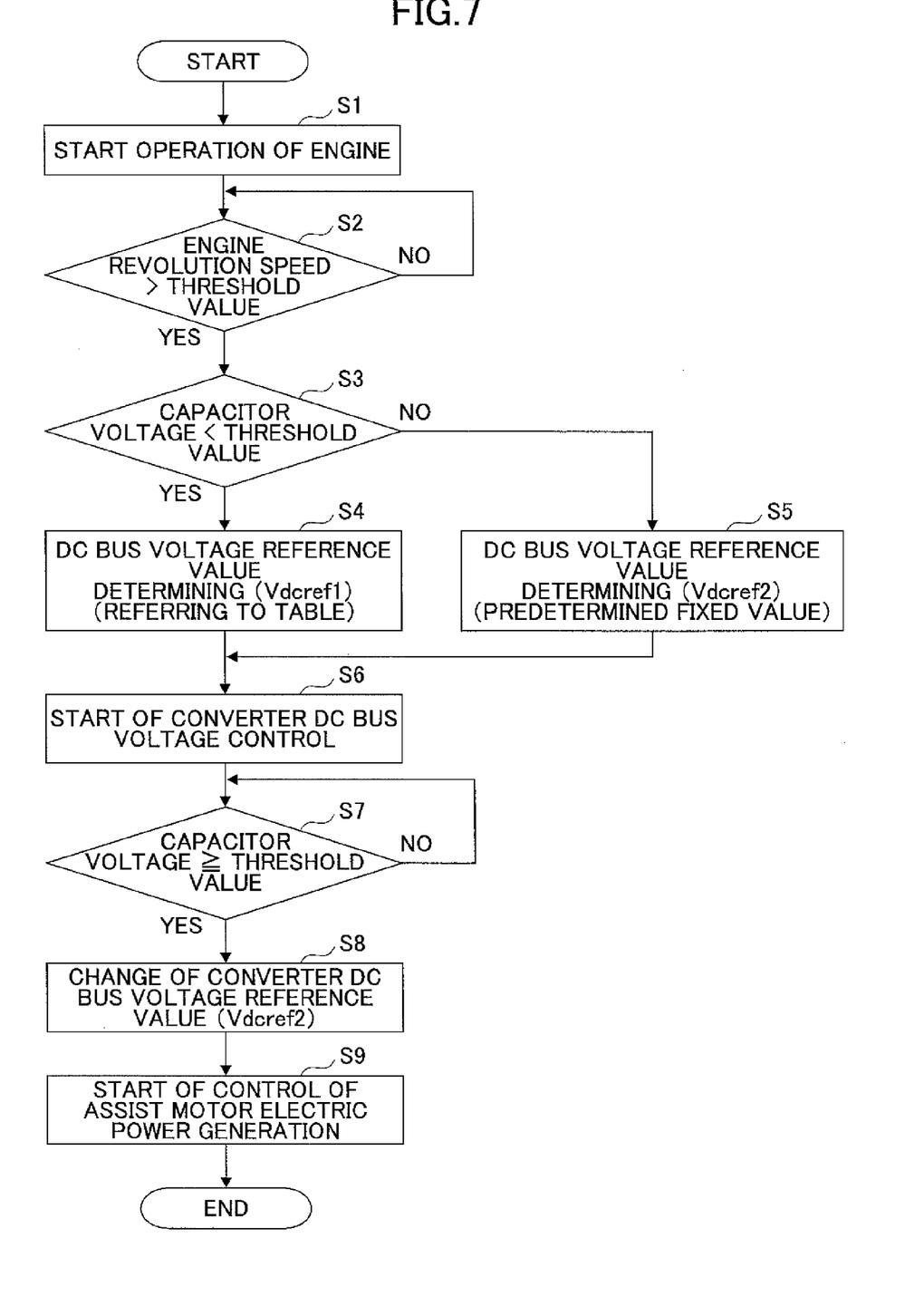
FIG. 7 is a flowchart of charging a capacitor with electricity using a charging method illustrated in FIG. 6.
Figure 8:
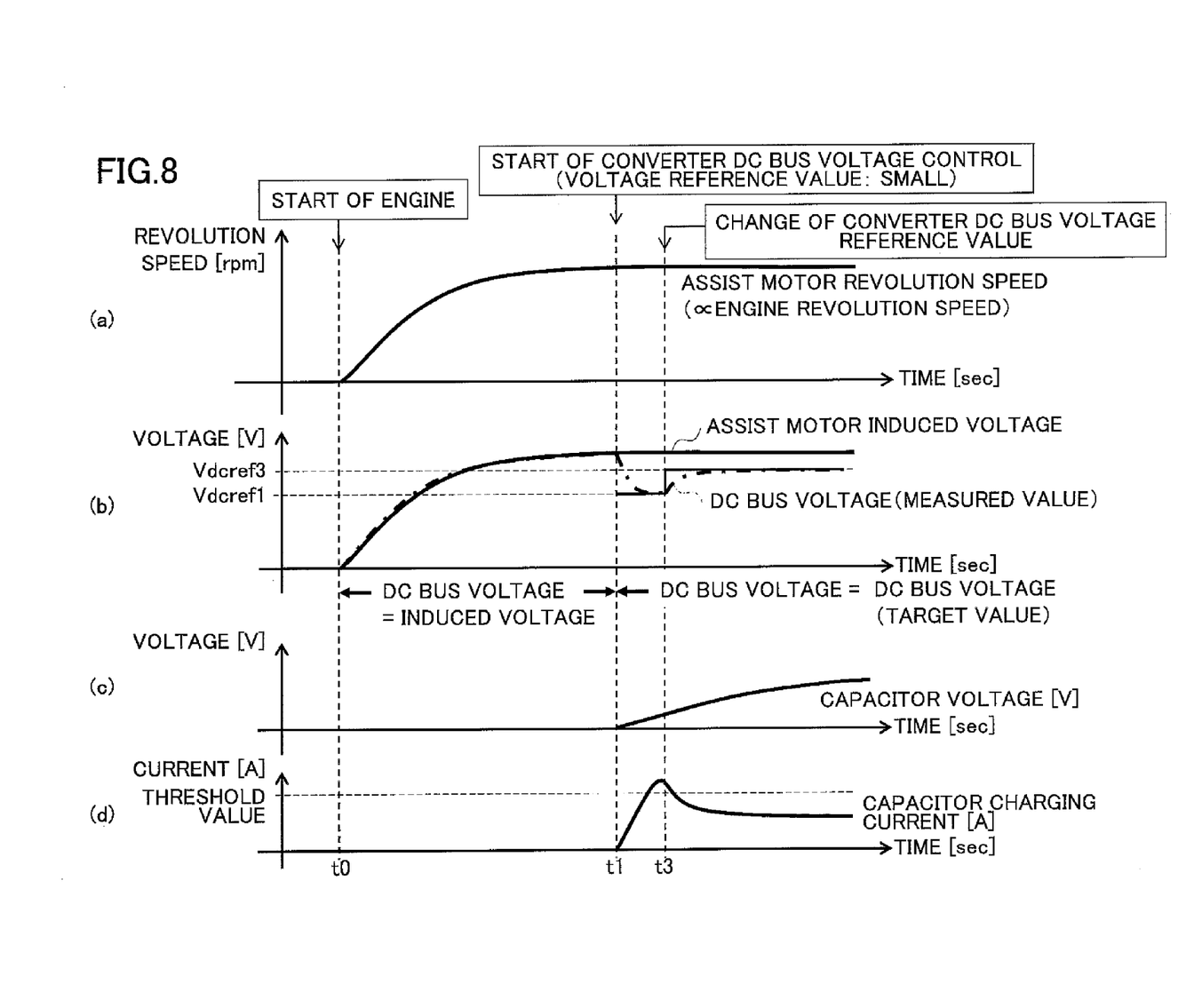
FIG. 8 is a graph illustrating temporal changes of the engine revolution speed, the DC bus voltage, the capacitor voltage and the charging current at a time of reducing the charging current by changing the DC bus voltage reference value.

FIG. 7 is a flowchart of charging the capacitor 19 with electricity using the charging method illustrated in FIG. 6.

In step S1, the engine 11 is started to drive the engine 11. In step S2, it is determined whether the engine revolution speed is less than a revolution speed threshold value. If the engine revolution speed is the revolution speed threshold value or less, it is determined that the engine revolution speed is increasing and the determination of step S2 is repeated until the engine revolution speed is stabilized. In (a) of FIG. 6, a portion corresponding to step S2 is not illustrated.

In step S2, if it is determined that the engine revolution speed is greater than the revolution speed threshold value, the process goes to step S3 and it is determined whether the capacitor voltage is smaller than the voltage threshold value. If the capacitor voltage is determined to be smaller than the voltage threshold value, it is determined that the charging rate SOC of the capacitor is zero (the capacitor is not charged) or approximately zero. Then, the process goes to step S4. In step S4, the above table information is referred to and a voltage smaller by a predetermined voltage than the induced voltage generated at the present revolution speed of the motor generator 12 is set as the DC bus voltage reference value (Vdcref1).

Subsequently, the process goes to step S6, and the DC bus voltage control by the converter 100 is started. Because the DC bus voltage reference value Vdcref1 is set to be a voltage value smaller by a predetermined voltage than the induced voltage than the present induced voltage supplied to the DC bus 110, a charging current corresponding to a difference between the induced voltage and the DC bus voltage reference value (Vdcref1) flows into the capacitor 19. The induced voltage generated by the motor generator 12 depends on the revolution speed of the engine 11. Because the engine 11 is controlled to have a constant revolution speed, the variation of the induced voltage is small. By setting the difference between the induced voltage and the DC bus voltage reference value (Vdcref1) to be a small voltage, even if the voltage of the capacitor 19 is zero or approximately zero, the charging current does not become great and a stabilized charging current smaller than a maximum permissible charging current can be sent to the capacitor 19.

On the other hand, if it is determined that the capacitor voltage is the voltage threshold value or more in step S3, the charging rate SOC of the capacitor is determined to be great to a certain extent and it is determined to send the charging current by the ordinary charging control. Then, the process goes to step S5. In step S5, the DC bus voltage reference value (Vdcref2) used in the ordinary charging control is set as the DC bus voltage reference value. The DC bus voltage reference value (Vdcref2) is a voltage value greater than the DC bus voltage reference value (Vdcref1). Said differently, the DC bus voltage reference value (Vdcref1), set when the voltage of the capacitor 19 is small, is smaller than the DC bus voltage reference value (Vdcref2) used in the ordinary charging control (Vdcref1<Vdcref2).

Subsequently, the process goes to step S6, and the DC bus voltage control by the converter 100 is started. Subsequently, in step S7, it is determined whether the capacitor voltage is the above voltage threshold value. If the capacitor voltage is the above voltage threshold value or greater, it is determined that the capacitor 19 is charged to a certain extent and the ordinary charging control may be performed again. Then, the process goes to step S8. In step S8, the DC bus voltage reference value (Vdcref2) used in the ordinary charging control is used instead of the previously set DC bus voltage reference value (Vdcref1). When the DC bus voltage reference value (Vdcref2) is set in step S5, the DC bus voltage reference value (Vdcref2) is maintained as is in step S8. In step S9, a generation control (an inverter control) of the motor generator 12 by the inverter is started, and the electric power obtained by the generation operation of the motor generator 12 is supplied to the DC bus 110. Therefore, the electric power generated by the motor generator 12 flows into the capacitor 19 to thereby quickly charge the capacitor 19.

Referring back to the charging method illustrated in FIG. 5, if there is a probability of the charging current to the capacitor 19 becoming excessive, the DC bus voltage reference value (Vdcref1) may be adjusted based on the charging current. Specifically, if the charging current increases and exceeds an electric current threshold value after the capacitor 19 starts to be charged as illustrated in (d) of FIG. 8, it is determined that there is a probability that the charging current exceeds the maximum permissible charging current. Then, the DC bus voltage reference value is changed from the DC bus voltage reference value (Vdcref1) to a DC bus voltage reference value (Vdcref3) as illustrated in (b) of FIG. 8. With this, a difference between the induced voltage supplied to the DC bus 110 and the DC bus voltage reference value becomes small and the charging current is reduced. If a difference between the induced voltage and the initially set DC bus voltage reference value (Vdcref1) is, for example, 10 V, the difference between the DC bus voltage reference value (Vdcref3) and the DC bus voltage reference value (Vdcref1) may be preset so as to be a smaller value, for example, 5 V.

Figure 9:
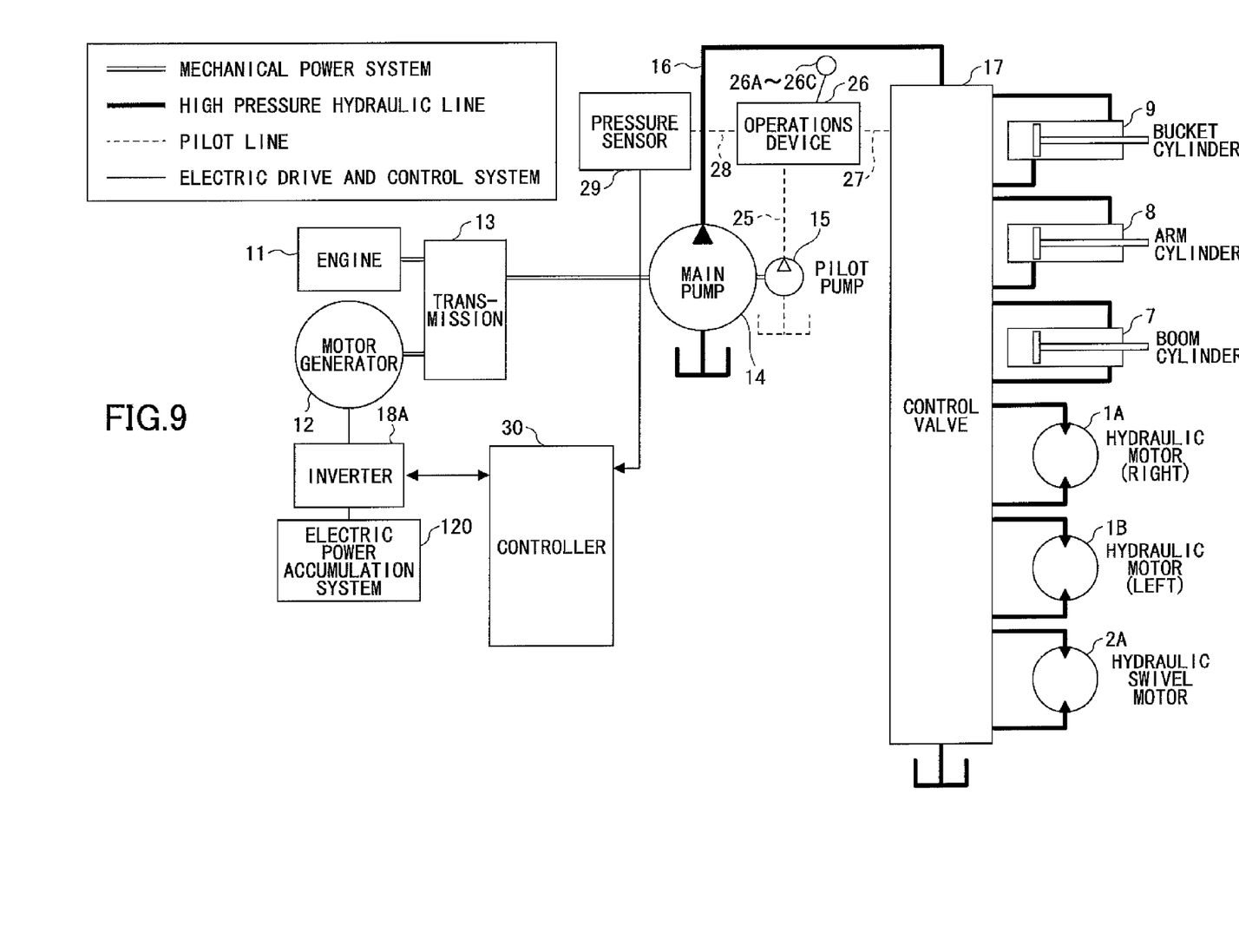
FIG. 9 is a diagram illustrating an exemplary drive system of the hybrid-type hydraulic shovel in which a swivel mechanism is driven by a hydraulic swivel motor.

In the above description, the swivel mechanism 2 is electromotive. However, the swivel mechanism 2 may be hydraulically driven, not electrically driven. FIG. 9 is a diagram illustrating an exemplary drive system of the hybrid-type hydraulic shovel in which the swivel mechanism illustrated in FIG. 2 is changed to a hydraulically driven swivel mechanism. Referring to the hybrid-type hydraulic shovel illustrated in FIG. 9, a hydraulic swivel motor 2A is connected to the control valve 17 instead of the swivel motor 21, and the swivel mechanism 2 is driven by the hydraulic swivel motor 2A. In this hybrid-type hydraulic shovel, the charging current of the capacitor 19 in initially charging the capacitor 19 may be suppressed to thereby prevent an excessive charging current from flowing.

Figure 10:
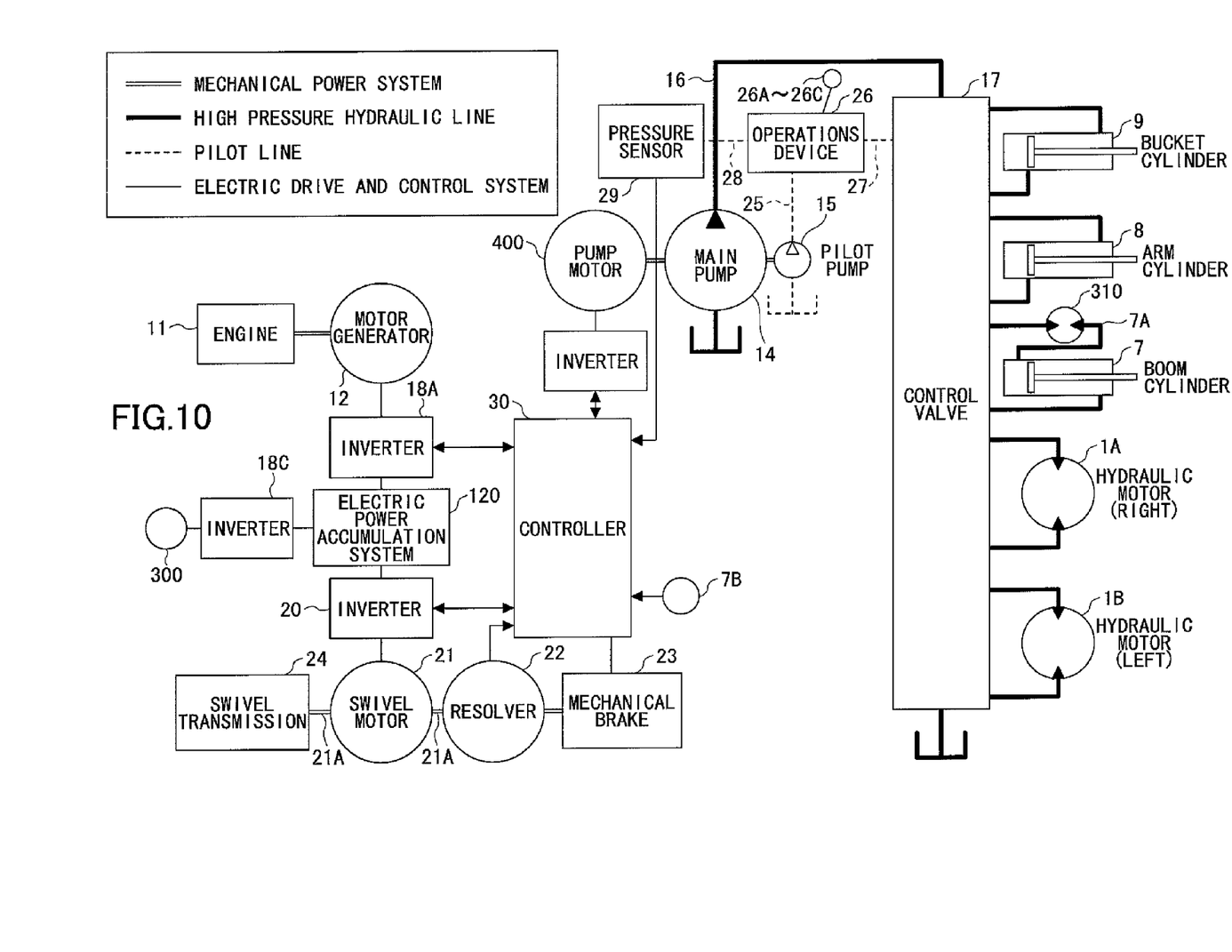
FIG. 10 is a diagram illustrating an exemplary drive system of the hybrid-type hydraulic shovel of a series type.

In the above embodiment, a so-called parallel-type hybrid-type hydraulic shovel in which the engine 11 and the motor generator 12 are connected to the main pump 14 being the hydraulic pump to thereby drive the main pump is applied to the present invention. However, the embodiment is applicable also to a so-called series-type hybrid-type hydraulic shovel in which the motor generator is driven by the engine 11, electric power generated by the motor generator 12 is accumulated in the electric power accumulation system 120, and a pump motor 400 is driven by only the accumulated electric power to drive the main pump 14, as illustrated in FIG. 10. In this case, the motor generator 12 has a function of performing as a generator part driven by the engine 11.

In the hybrid-type hydraulic shovel illustrated in FIG. 10, hydraulic pressure is regenerated using return hydraulic pressure from the boom cylinder 7. Said differently, a boom regenerative hydraulic motor 310 is provided in hydraulic piping for the return hydraulic pressure from the boom cylinder 7, and a generator part 300 is driven by the boom regenerative hydraulic motor 310 to generate the regenerative electric power. The electric power generated by the generator part 300 is supplied to the electric power accumulation system 120 via the inverter 180.

As described in the embodiment, the charging current can be suppressed so that the excessive charging current does not flow at a time of starting charging the electric power accumulator while the voltage of the electric power accumulator is very low.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

What is claimed is:
1. A hybrid-type construction machine comprising:
a generator part configured to generate electric energy by driving force of an engine;
an inverter configured to control the generator part;
an electric power accumulator configured to accumulate the electric energy generated by the generator part;
a DC bus located between the generator part and the electric power accumulator; and
a converter configured to control a voltage of the DC bus, wherein when the electric power accumulator having approximately zero electric energy is charged, the inverter of the generator part is not controlled, and a reference value of a voltage command for the DC bus to charge the electric power accumulator is set to be smaller than an induced voltage of the generator part.

2. The hybrid-type construction machine according to claim 1, wherein the reference value of the voltage command for the DC bus is increased along with an increment of a voltage of the electric power accumulator.

3. The hybrid-type construction machine according to claim 2, wherein when the voltage of the electric power accumulator becomes a predetermined threshold value or more, the reference value of the voltage command for the DC bus is set to be a value greater than the induced voltage.

4. The hybrid-type construction machine according to claim 3, wherein when a revolution speed of the engine reaches a predetermined revolution speed, the reference value of the voltage command for the DC bus is set to be a value lower than the induced voltage.

5. The hybrid-type construction machine according to claim 1, wherein when a voltage of the electric power accumulator becomes a predetermined threshold value or more, the inverter of the generator part starts being controlled.

6. The hybrid-type construction machine according to claim 1, wherein when an electric current flowing through the electric power accumulator has become a predetermined electric current value or more the reference value of the voltage command for the DC bus is increased.

* * * * *